(12) United States Patent
Huang

(10) Patent No.: US 10,791,859 B2
(45) Date of Patent: Oct. 6, 2020

(54) PORTABLE WATER PURIFIER

(71) Applicant: Eastern Pure Industrial Co., Ltd., New Taipei (TW)

(72) Inventor: Ching Heng Huang, New Taipei (TW)

(73) Assignee: Eastern Pure Industrial Co., Ltd., New Taipei (TW)

( * ) Notice: Subject to any disclaimer, the term of this patent is extended or adjusted under 35 U.S.C. 154(b) by 0 days.

(21) Appl. No.: 16/244,281

(22) Filed: Jan. 10, 2019

(65) Prior Publication Data

US 2019/0269266 A1 Sep. 5, 2019

(30) Foreign Application Priority Data

Mar. 5, 2018 (TW) .............................. 107202853 U

(51) Int. Cl.
*A47G 21/18* (2006.01)
*C02F 1/00* (2006.01)
*C02F 1/28* (2006.01)

(52) U.S. Cl.
CPC ............ *A47G 21/188* (2013.01); *C02F 1/002* (2013.01); *C02F 1/283* (2013.01)

(58) Field of Classification Search
CPC ....... A47G 21/188; C02F 1/002; C02F 1/283; C02F 2307/02

USPC ....... 210/435, 446, 439, 456, 464, 468, 470, 210/473, 477, 488, 252, 262

See application file for complete search history.

(56) References Cited

U.S. PATENT DOCUMENTS

| | | | |
|---|---|---|---|
| 6,569,329 B1 * | 5/2003 | Nohren, Jr. ............ | B01D 29/15 210/282 |
| 2005/0252844 A1 * | 11/2005 | Chau ....................... | C02F 1/003 210/282 |
| 2012/0298583 A1 | 11/2012 | Frauchiger et al. | |

* cited by examiner

*Primary Examiner* — Madeline Gonzalez
(74) *Attorney, Agent, or Firm* — Alan D. Kamrath; Karin L. Williams; Mayer & Williams PC

(57) ABSTRACT

A portable water purifier has a container, a lid assembly, and a filtering assembly. The container has a containing space. The lid assembly is mounted to the container by threading and has a suction nozzle communicating with the containing space. The filtering assembly is mounted in the container, is connected to the lid assembly, and has a cover and at least one filter element. The cover is disposed in the container, is adjacent to the lid assembly, and has a communicating tube communicating with the suction nozzle and an interior of the container. The at least one filter element is disposed between the cover and a bottom of the container.

18 Claims, 9 Drawing Sheets

PORTABLE WATER PURIFIER

BACKGROUND OF THE INVENTION

1. Field of the Invention

The present invention relates to a portable water purifier, and more particularly to a portable water purifier that can be used repeatedly.

2. Description of Related Art

With reference to FIG. 9, a conventional portable water purifier 80 comprises two ends, a body 81, an activated carbon filter layer 82, and a fiber filter layer 83. The activated carbon filter layer 82 and the fiber filter layer 83 are fixed in the body 81, and the activated carbon filter layer 82 and the fiber filter layer 83 are connected with each other. When the conventional portable water purifier 80 is in use, water flows into the body 81 from one of the two ends of the conventional portable water purifier 80 adjacent to the activated carbon filter layer 82. Then the water flows through the activated carbon filter layer 82 and the fiber filter layer 83 sequentially. The activated carbon filter layer 82 and the fiber filter layer 83 provide different filtering effects to the water. The activated carbon filter layer 82 and the fiber filter layer 83 filter impurities out from the water, and turn the water into clean and edible water.

However, the conventional portable water purifier 80 has the following shortcomings. The activated carbon filter layer 82 and the fiber filter layer 83 are fixed in the body 81. After a long term use, the activated carbon filter layer 82 and the fiber filter layer 83 will be clogged by impurities, which lead to the decline of the filtering effect. The structure of the conventional portable water purifier 80 does not allow users to replace dirty and clogged elements individually. Users can only replace the whole conventional portable water purifier 80 with a new one, which not only leads to a waste of the body 81 but also pollutes the environment.

SUMMARY OF THE INVENTION

The main objective of the present invention is to provide a portable water purifier that can be used repeatedly.

The portable water purifier in accordance with the present invention has a container, a lid assembly, and a filtering assembly. The container is a cylinder and has a containing space. The lid assembly is mounted to the container by threading and has a suction nozzle communicating with the containing space. The filtering assembly is mounted in the container, is connected to the lid assembly, and has a cover and at least one filter element. The cover is disposed in the container, is adjacent to the lid assembly, and has a communicating tube communicating with the suction nozzle and an interior of the container. The at least one filter element is disposed between the cover and a bottom of the container.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
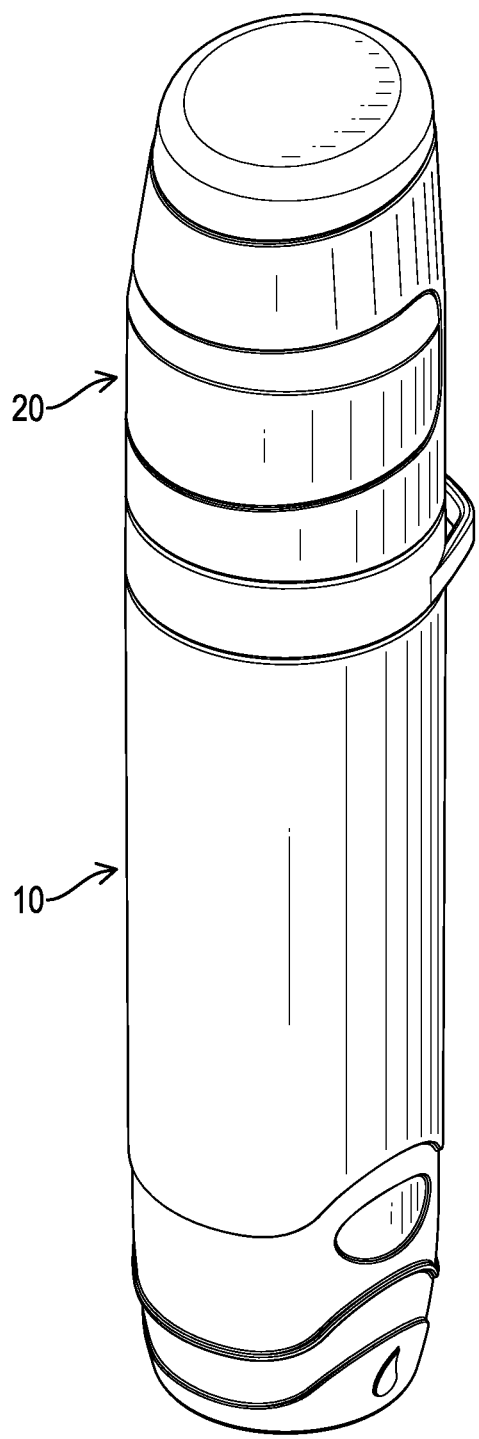
FIG. 1 is a perspective view of a first embodiment of a portable water purifier in accordance with the present invention.

With reference to FIGS. 1 to 4, a first embodiment of a portable water purifier in accordance with the present invention comprises a container 10, a lid assembly 20, a filtering assembly 30, a first filter element 40, and a second filter element 50.

Figure 2:
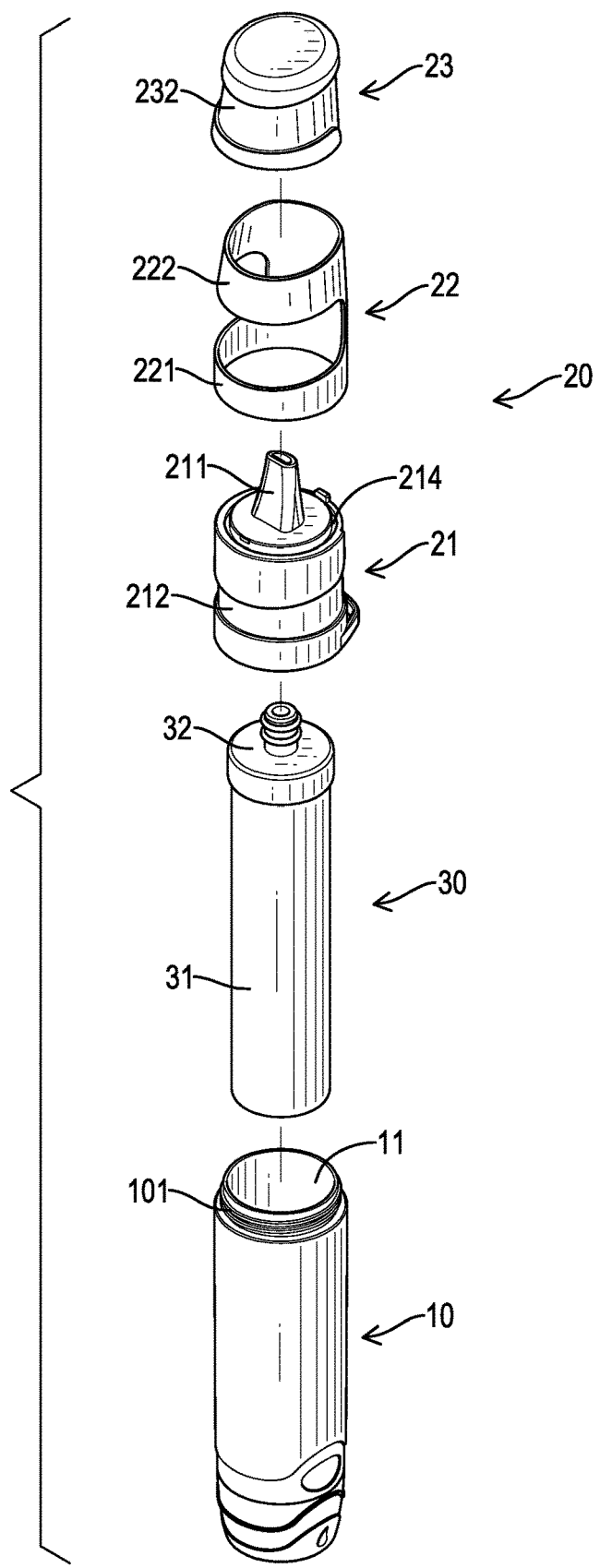
FIG. 2 is an exploded perspective view of the portable water purifier in FIG. 1.
Figure 4:
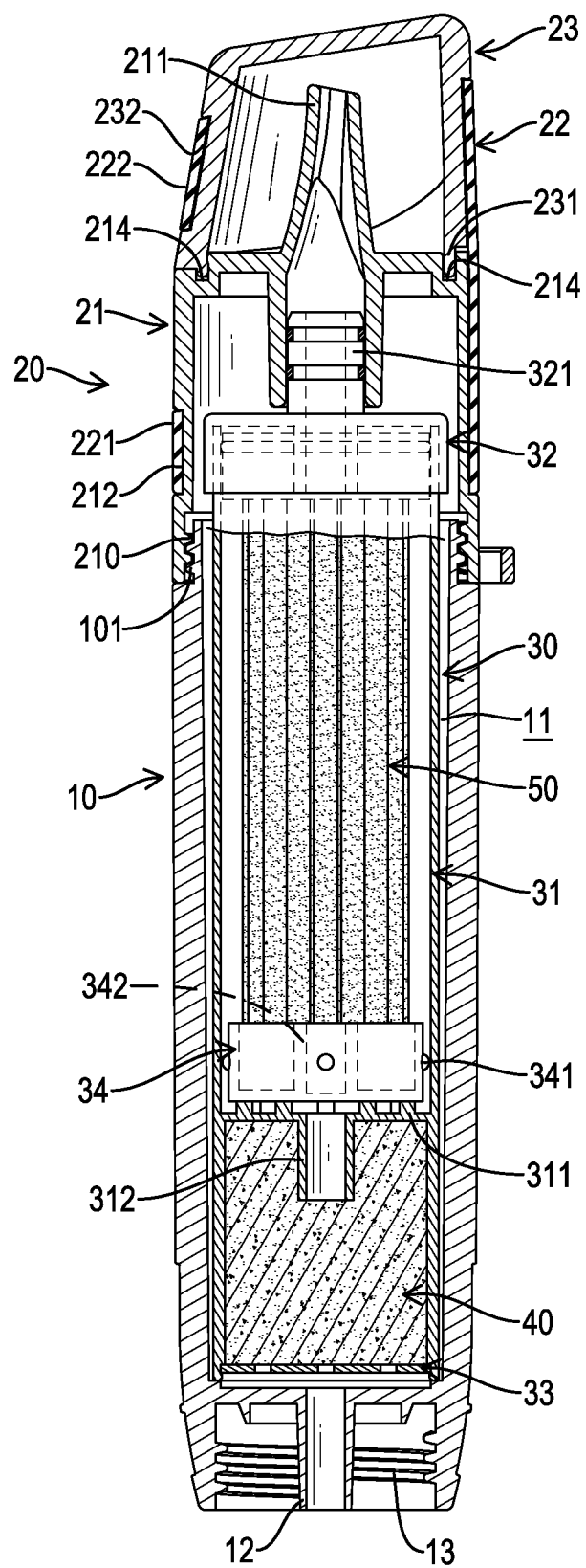
FIG. 4 is a side view in partial section of the portable water purifier in FIG. 1.

With reference to FIGS. 2 and 4, the container 10 is a hollow cylinder, and has two ends, a threaded portion 101, a containing space 11, an inlet tube 12, and an engaging thread 13. The threaded portion 101 is formed at one of the two ends of the container 10. The containing space 11 is formed in the container 10, is formed through one of the two ends of the container 10, and forms an opening adjacent to the threaded portion 101. The inlet tube 12 is formed on and protrudes from one of the two ends of the container 10 that is far away from the threaded portion 101, and communicates with the containing space 11. The containing space 11 is formed between the threaded portion 101 and the inlet tube 12. The engaging thread 13 is formed at one of the two ends of the container 10, surrounds the inlet tube 12, and can be connected with a lid of a bottle by threading.

With reference to FIGS. 1, 2 and 4, the lid assembly 20 is detachably mounted to the container 10, and has a water-sucking portion 21, a sheath 22, and a sealing lid 23. The water-sucking portion 21 is mounted to the container 10, and has two ends, an inner surface, an inner thread 210, a suction nozzle 211, a groove 212, and a recess 214. The inner thread 210 is formed at one of the two ends of the water-sucking portion 21 and at the inner surface of the water-sucking portion 21, is adjacent to the container 10, and can be threaded with the threaded portion 101 of the container 10. In this way, the water-sucking portion 21 can be mounted to the container 10.

The suction nozzle 211 protrudes from one of the two ends of the water-sucking portion 21, is away from the inner thread 210, is disposed at a center of the water-sucking portion 21, and communicates with a space formed between the suction nozzle 211 and the containing space 11 of the container 10. The groove 212 is caved inwardly and annularly on an outer surface of the water-sucking portion 21, and is between the inner thread 210 and the suction nozzle 211. The recess 214 is caved downwardly and annularly on a top surface of the water-sucking portion 21, is away from the inner thread 210, and is adjacent to a periphery of the suction nozzle 211.

With reference to FIGS. 2 and 4, the sheath 22 is sleeved on the water-sucking portion 21 and has a first belt 221 and a second belt 222. The first belt 221 is sleeved on the groove 212 of the water-sucking portion 21. The second belt 222 is disposed on the sheath 22, is away from the water-sucking portion 21, is connected to the first belt 221, and is disposed at a spaced interval relative to the first belt 221.

The sealing lid 23 is mounted with the water-sucking portion 21, and is sleeved by the sheath 22. The sealing lid 23 has a bottom flange 231 and a side recess 232. The bottom flange 231 protrudes from a bottom of the sealing lid 23 and has a contour corresponding to that of the recess 214 of the water-sucking portion 21. The bottom flange 231 is engaged in the recess 214 so that the sealing lid 23 can be mounted to the water-sucking portion 21. The side recess 232 is caved inwardly and annularly on an outer surface of the sealing lid 23. The second belt 222 of the sheath 22 is sleeved on the side recess 232, so the sealing lid 23 abuts against the water-sucking portion 21 securely. The combination relationships between the first belt 221 and the groove 212 and between the second belt 222 and the side recess 232 enable the sealing lid 23 to abut against the water-sucking portion 21 securely.

Figure 3:
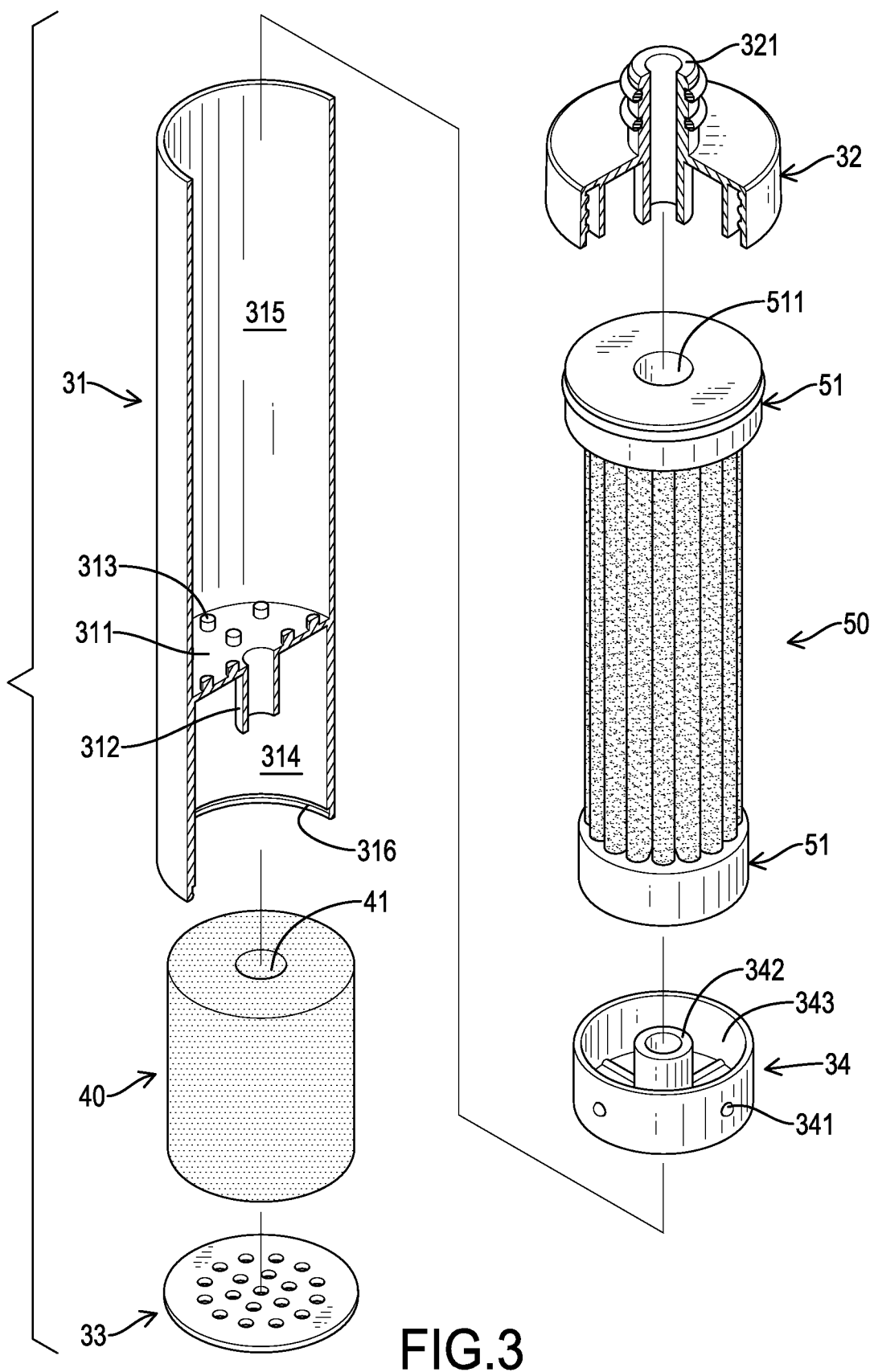
FIG. 3 is an enlarged exploded perspective view in partial section of the portable water purifier in FIG. 1.

With reference to FIGS. 2 to 4, the filtering assembly 30 is mounted in the container 10 and connected to the lid assembly 20. The filtering assembly 30 has a body 31, a cover 32, a porous element 33, and a positioning seat 34. The body 31 is disposed in the containing space 11 of the container 10. The body 31 is a cylinder and has a separating board 311 and an engaging recess 316. The separating board 311 is disposed in the body 31 horizontally and divides the body 31 into two parts, which are a first chamber 314 and a second chamber 315. The separating board 311 has a guiding tube 312 and multiple protrusions 313. The guiding tube 312 protrudes downwardly on the separating board 311, extends toward the first chamber 314, and has a through hole formed through the separating board 311. The first chamber 314 communicates with the second chamber 315 via the through hole of the guiding tube 312. The multiple protrusions 313 are disposed at spaced intervals on the separating board 311. Each one of the multiple protrusions 313 protrudes upwardly on the separating board 311, extends toward the second chamber 315, and is away from the guiding tube 312. The engaging recess 316 is caved annularly on an inner surface of the body 31 and is adjacent to the first chamber 314.

The cover 32 is mounted to the body 31 and the water-sucking portion 21 of the lid assembly 20. The cover 32 is mounted to the body 31, is adjacent to the second chamber 315, is adjacent to the lid assembly 20, and has a communicating tube 321. With reference to FIG. 4, the communicating tube 321 extends along an axial direction of the cover 32 and passes through the cover 32. A top of the cover 32 and a bottom of the cover 32 communicate with each other via the communicating tube 321. Moreover, an end of the communicating tube 321 that is away from the body 31 extends into the suction nozzle 211 of the water-sucking portion 21, which enables the suction nozzle 211 to communicate with the communicating tube 321.

With reference to FIGS. 3 and 4, the porous element 33 is mounted to the body 31. The porous element 33 is a disc and has multiple holes disposed separately. Each one of the multiple holes is formed through the porous element 33 along an axial direction of the porous element 33, and has the same diameter with one another. Furthermore, a thickness and an outer diameter of the porous element 33 are corresponding to a depth and an inner diameter of the engaging recess 316, respectively. So the porous element 33 can be mounted in the engaging recess 316, and is adjacent to the first chamber 314. The positioning seat 34 is disposed in the second chamber 315 of the body 31 and abuts against the multiple protrusions 313 of the separating board 311. An outer diameter of the positioning seat 34 is smaller than an inner diameter of the body 31.

The positioning seat 34 has multiple protruding parts 341, a connecting tube 342, and a positioning recess 343. The multiple protruding parts 341 protrude on an outer surface of the positioning seat 34 at spaced intervals, and each one of the multiple protruding parts 341 abuts against the inner surface of the body 31. The connecting tube 342 protrudes on the positioning seat 34 upwardly, extends toward the cover 32, is disposed at a center of the positioning seat 34, and aligns with the communicating tube 321. The positioning recess 343 is formed in the positioning seat 34, faces the cover 32, and surrounds the connecting tube 342. Furthermore, a gap is formed between the positioning seat 34 and the separating board 311 because the positioning seat 34 abuts the multiple protrusions 313 of the separating board 311. A clear space is formed between the positioning seat 34 and the body 31 because the inner wall of the body 31 abuts the multiple protruding parts 341 of the positioning seat 34.

With reference to FIGS. 3 and 4, the first filter element 40 is mounted to the body 31, and is disposed in the first chamber 314 between the separating board 311 and the porous element 33. The first filter element 40 comprises at least one filter layer. The at least one filter layer may be a carbon fiber filter layer or an activated carbon filter layer. The first filter element 40 has a first positioning hole 41. The first positioning hole 41 is caved inwardly on a surface of the first filter element 40, is adjacent to the separating board 311, and receives the guiding tube 312. Moreover, the first filter element 40 comprises multiple filter layers, and each one of the multiple filter layers has multiple pores of the same size. The multiple filter layers are compacted and arranged according to the size of the multiple pores of each one of the multiple filter layers. The filter layer with the biggest pores is adjacent to the porous element 33, and the filter layer with the smallest pores is adjacent to the separating board 311. The structure of each one of the multiple filter layers is a prior art, so descriptions thereof are omitted.

The second filter element 50 is mounted to the body 31, and is disposed in the second chamber 315 between the cover 32 and the positioning seat 34. The second filter element 50 is a fiber filter and has two mounting seats 51. The two mounting seats 51 are respectively disposed at two ends of the second filter element 50, and each one of the two mounting seats 51 has a second positioning hole 511. One of the two mounting seats 51 is adjacent to the positioning seat 34, and the other one of the two mounting seats 51 is adjacent to the cover 32. The mounting seat 51 adjacent to the positioning seat 34 extends into the positioning recess 343 and is mounted to the positioning seat 34. The mounting seat 51 adjacent to the cover 32 is mounted to the cover 32. The two second positioning holes 511 receive the communicating tube 321 and the connecting tube 342, respectively.

Figure 5:
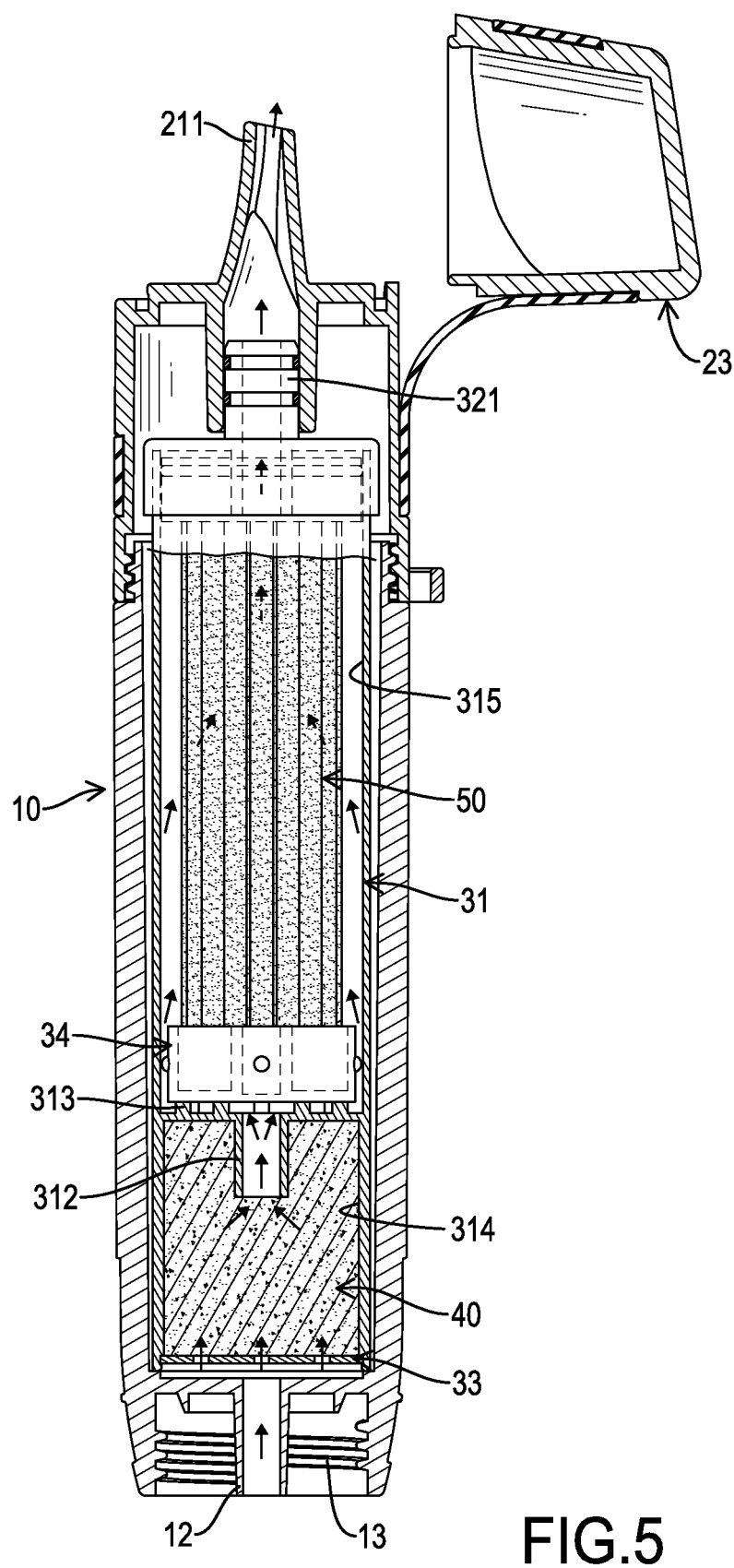
FIG. 5 is an operational side view in partial section of the portable water purifier in FIG. 1.

With reference to FIG. 5, when in use, the sealing lid 23 is opened and air is drawn in from the suction nozzle 211. Water outside the portable water purifier will flow through the inlet tube 12 into the containing space 11 of the container 10 due to a pressure difference between an exterior and an interior of the portable water purifier. The porous element 33 gives the water a rudimentary filter and filters out large-sized impurities. Then the water flows in the first chamber 314 of the body 31. After a further filtering given by the first filter element 40, the water flows through the guiding tube 312 and passes through the gap between the multiple protrusions 313. At last, the water flows through the clear space between the positioning seat 34 and the body 31 and reaches into the second element 50. Then the second element 50 gives the water the last filtering process. Purified water flows from the second chamber 315 into the communicating tube 321, and leaves the portable water purifier through the suction nozzle 211. Users can get purified water from the suction nozzle 211 thereby.

Figure 6:
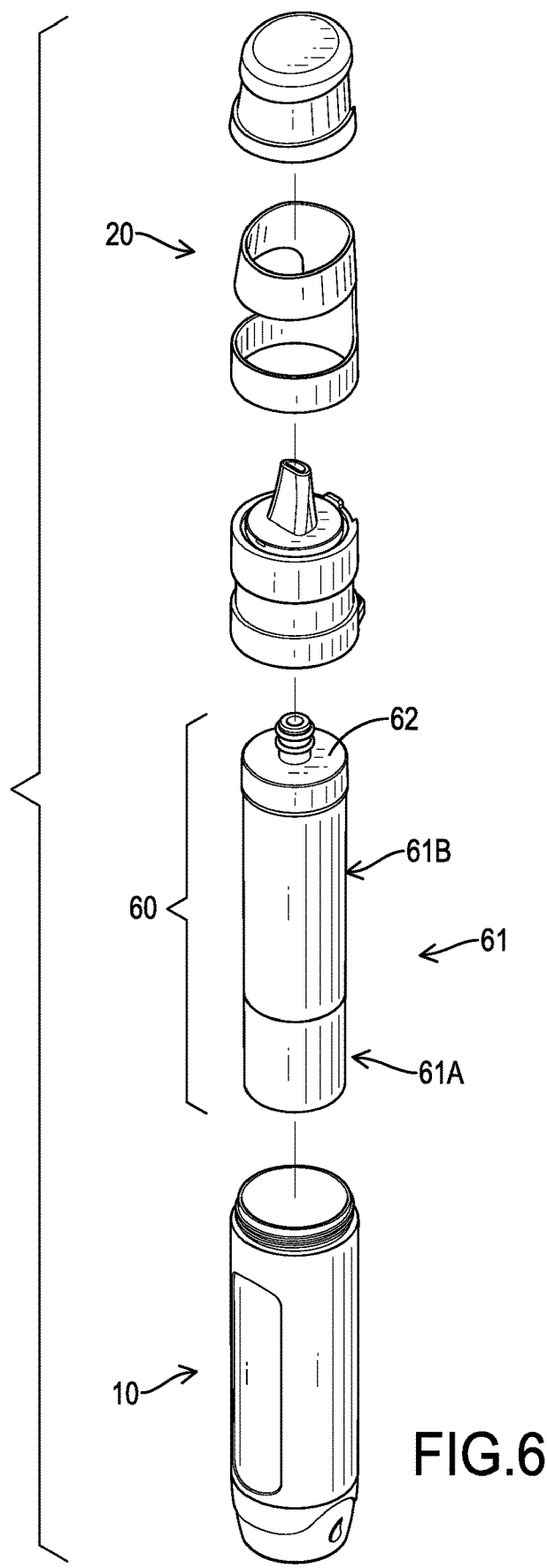
FIG. 6 is an exploded perspective view of a second embodiment of a portable water purifier in accordance with the present invention.
Figure 7:
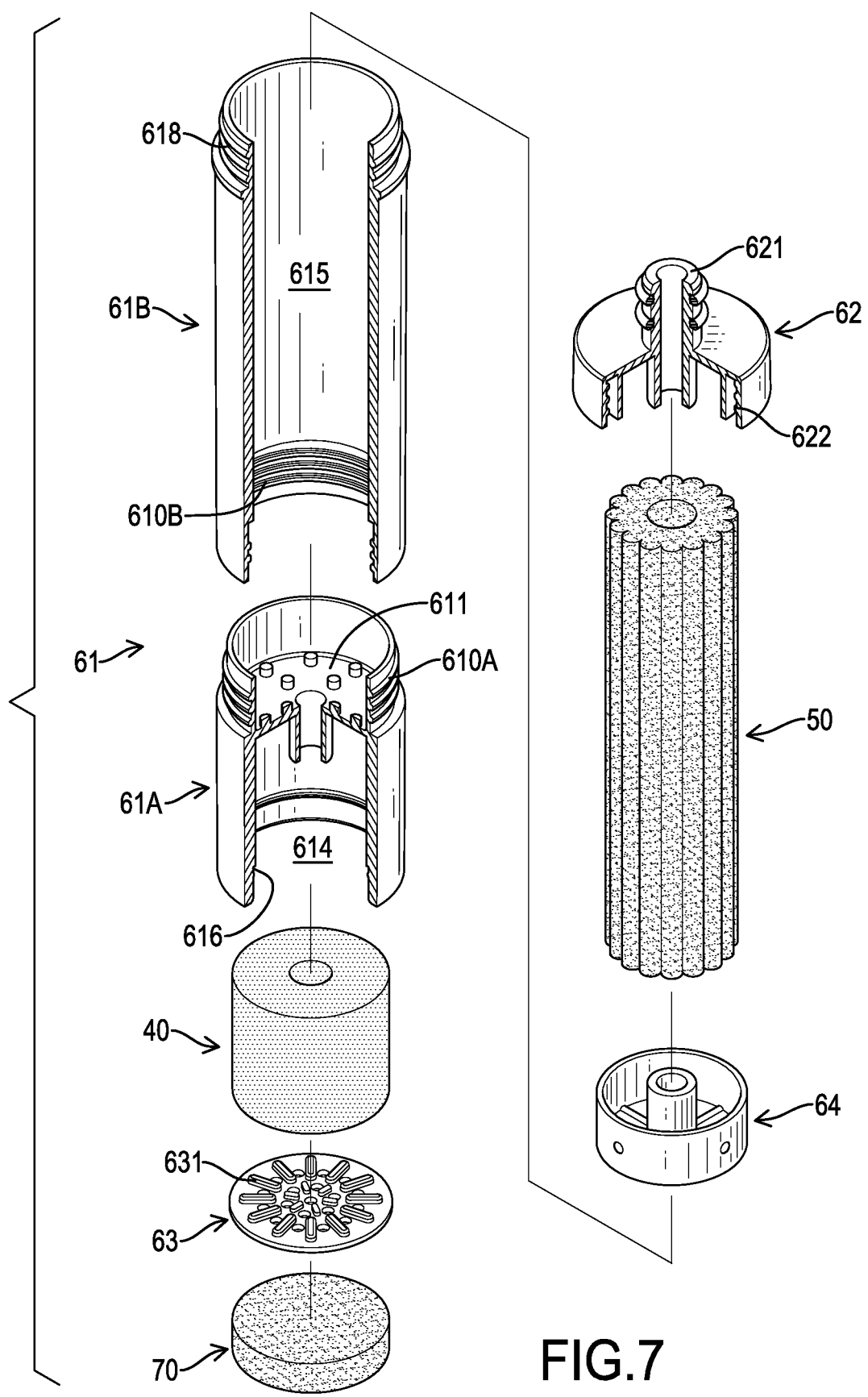
FIG. 7 is an enlarged exploded perspective view in partial section of the portable water purifier in FIG. 6.
Figure 8:
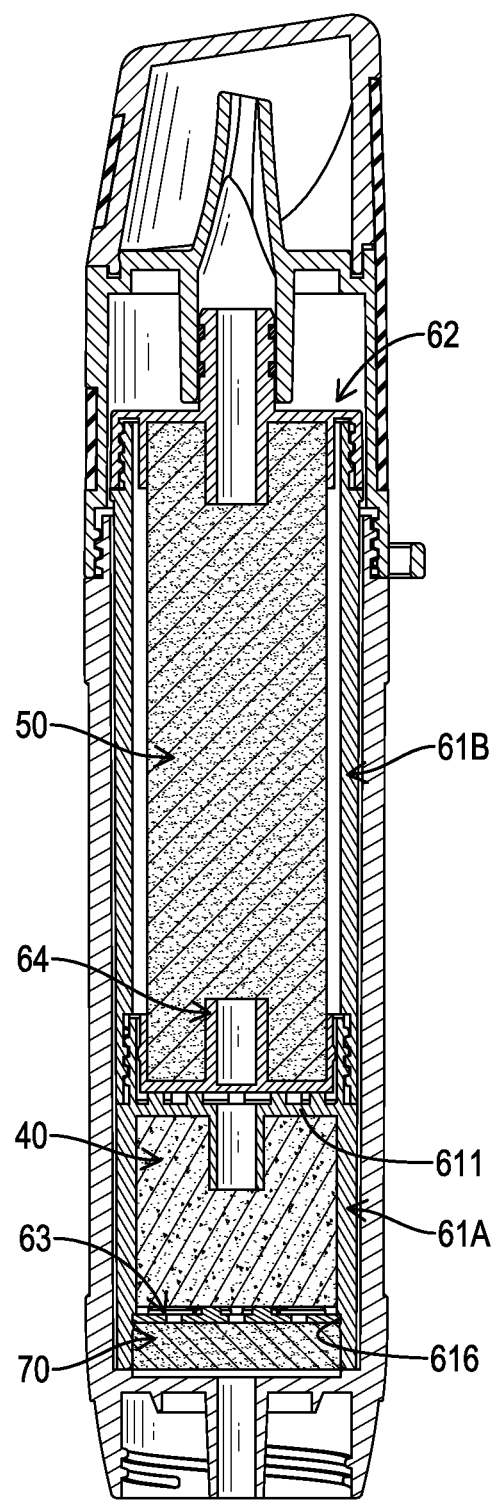
FIG. 8 is a side view in partial section of the portable water purifier in FIG. 6.

With reference to FIGS. 6 to 8, a second embodiment in accordance with the present invention is substantially the same as the first embodiment, and the difference between the second embodiment and the first embodiment is that the body 61 of the filtering assembly 60 comprises a first casing 61A and a second casing 61B. The first casing 61A has two ends, a side surface, a first joining thread 610A, and multiple through holes. The first joining thread 610A is formed at an outer periphery of one of the two ends of the first casing 61A. Each one of the multiple through holes is disposed through the side surface of the first casing 61A. After water flows into the containing space 11 of the container 10, the multiple through holes provide the water more routes to enter an interior of the first casing 61A. Therefore, the flowing velocity of the water increases. The second casing 61B has two ends and a second joining thread 610B, and the second joining thread 610B is formed at an inner periphery of one of the two ends of the second casing 61B. The first casing 61A and the second casing 61B can be assembled by connecting the first joining thread 610A to the second joining thread 610B by threading.

Moreover, the body 61 has a separating board 611, an engaging recess 616, and a body thread 618. The separating board 611 is disposed in the first casing 61A, and is adjacent to the first joining thread 610A. When the first casing 61A and the second casing 61B are assembled, the separating board 611 divides the body 61 into two parts, which are a first chamber 614 and a second chamber 615. The first chamber 614 is formed within the first casing 61A, and the second chamber 615 is formed within the second casing 61B. The engaging recess 616 is caved annularly on an inner surface of the first casing 61A, and the engaging recess 616 is disposed at a spaced interval relative to the separating board 611. The body thread 618 is formed at an outer surface of the second casing 61B, and is away from the second joining thread 610B.

Furthermore, the cover 62 has a cover thread 622. The cover thread 622 is formed at an inner surface of the cover 62, is away from the communicating tube 621, and corresponds to the body thread 618. The cover 62 and the body 61 can be assembled by threading the cover thread 622 to the body thread 618. The second filter element 50 does not have the two mounting seats 51. The second filter element 50 is disposed between the cover 62 and the positioning seat 64. The porous element 63 is mounted in the engaging recess 616, and is disposed at a spaced interval relative to the separating board 611. The porous element 63 divides the first chamber 614 into two spaces. One of the two spaces is formed between the porous element 63 and the separating board 611. The other one of the two spaces is formed between the first casing 61A and the porous element 63. The first filter element 40 is disposed in the space formed between the porous element 63 and the separating board 611. The porous element 63 has two surfaces. One of the two surfaces of the porous element 63 that faces the separating board 611 has multiple ribs 631. The multiple ribs 631 are disposed separately on one of the two surfaces that faces the separating board 611 and the first chamber 314 to increase the structural strength of the porous element 63. When the porous element 63 is mounted to the engaging recess 616, the multiple ribs 631 extend into the first chamber 614 so as to provide stability to the first filter element 40. Moreover, there is a third filter element 70 disposed in the space formed between the first casing 61A and the porous element 63. The third filter element 70 is a sponge, and the third filter element 70 is disposed between the porous element 63 and a bottom of the containing space 11.

Figure 9:
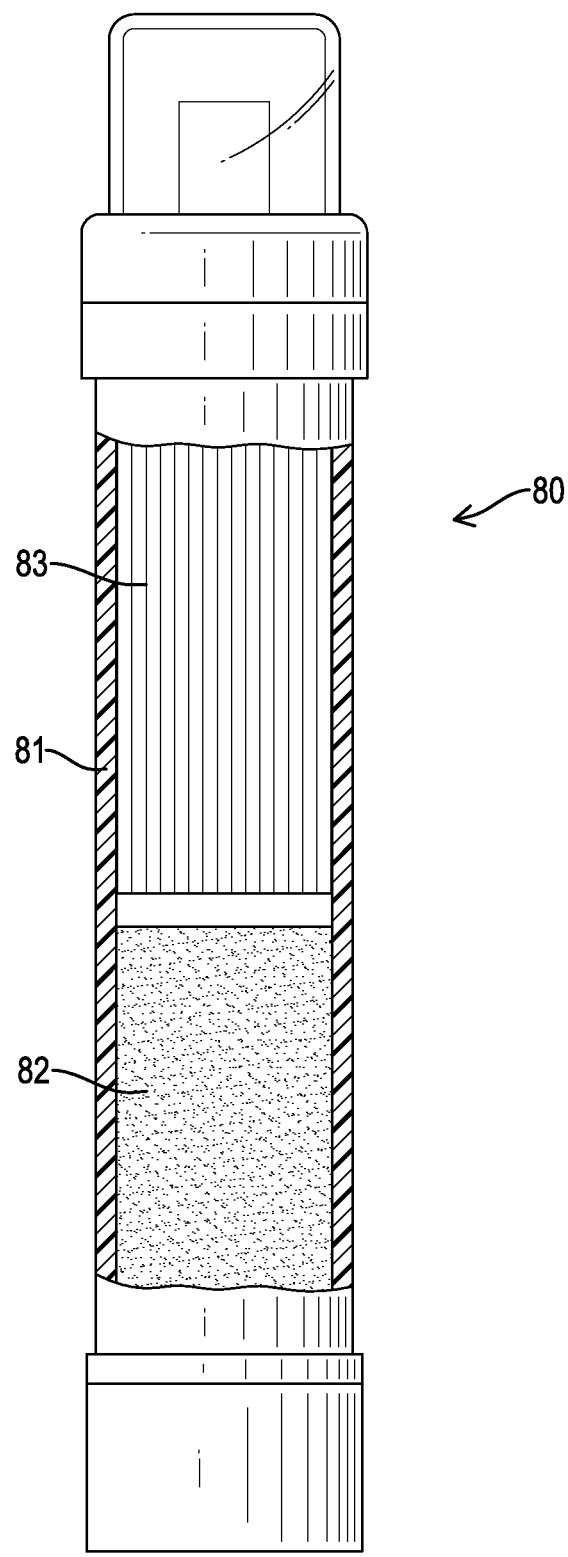
FIG. 9 is a side view in partial section of a portable water purifier in accordance with the prior art.

The structure of the filtering assembly 30, 60 enables users to assemble the first filter element 40 and the second filter element 50 in the filtering assembly 30, 60 conveniently. The portable water purifier can be used after the filtering assembly 30, 60 is mounted to the container 10 and the lid assembly 20. When the first filter element 40 and the second filter element 50 are clogged by impurities, detach the filtering assembly 30, 60 from the container 10. Next, detach the cover 32, 62 and the porous element 33, 63 from the body 31. Then the first filter element 40 and the second filter element 50 can be detached and replaced. The shortcoming that the clogged and dirty elements in the conventional portable water purifier in FIG. 9 cannot be replaced individually is solved by the present invention. The present invention provides the portable water purifier that can be used repeatedly.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A portable water purifier comprising:
   a container having
      a containing space;
   a lid assembly mounted to the container by threading, and having
      a suction nozzle communicating with the containing space; and
   a filtering assembly mounted in the container, connected to the lid assembly, and having
      a body having
         a separating board disposed in the body to divide the body into a first chamber and a second chamber, and having
            a guiding tube protruding on the separating board, extending toward the first chamber, and disposed through the separating board; and
            multiple protrusions disposed at spaced intervals on the separating board, protruding on the separating board, and extending toward the second chamber; and
      a porous element mounted to the body, being away from the lid assembly, and being adjacent to the first chamber;
      a cover disposed in the container, mounted to the body, being adjacent to the lid assembly, being adjacent to the second chamber, and having
         a communicating tube communicating with the suction nozzle and an interior of the container;
      a first filter element disposed in the first chamber; and
      a second filter element disposed in the second chamber.

2. The portable water purifier as claimed in claim 1, wherein the first filter element is selected from a carbon fiber filter layer and an activated carbon filter layer, and the second filter element is a fiber filter.

3. The portable water purifier as claimed in claim 1, wherein the filtering assembly has
- a positioning seat disposed in the body, abutting against the multiple protrusions of the separating board, and having
  - an outer diameter smaller than an inner diameter of the body;
- multiple protruding parts protruding on an outer surface of the positioning seat at spaced intervals, and each one of the multiple protruding parts abutting against an inner surface of the body; and
- a connecting tube protruding on the positioning seat and extending toward the cover.

4. The portable water purifier as claimed in claim 1, wherein the first filter element has a first positioning hole receiving the guiding tube.

5. The portable water purifier as claimed in claim 3, wherein the second filter element has
- two ends; and
- two mounting seats respectively disposed at the two ends of the second filter element, and each one of the two mounting seats having a respective second positioning hole, the two second positioning holes receiving the connecting tube of the positioning seat and the communicating tube of the cover, respectively.

6. The portable water purifier as claimed in claim 2, wherein
- the body has
  - a first casing; and
  - a second casing mounted to the first casing by threading;
- the first chamber of the body is formed in the first casing;
- the second chamber of the body is formed in the second casing; and
- the separating board is disposed in the first chamber and is adjacent to the second chamber.

7. The portable water purifier as claimed in claim 6, wherein the body is mounted to the cover by threading.

8. The portable water purifier as claimed in claim 7, wherein the porous element has
- two surfaces; and
- multiple ribs disposed separately on one of the two surfaces of the porous element that faces the separating board.

9. The portable water purifier as claimed in claim 1, wherein
- the body has
  - a first casing; and
  - a second casing mounted to the first casing by threading;
- the first chamber of the body is formed in the first casing;
- the second chamber of the body is formed in the second casing; and
- the separating board is disposed in the first chamber and is adjacent to the second chamber.

10. The portable water purifier as claimed in claim 3, wherein
- the body has
  - a first casing; and
  - a second casing mounted to the first casing by threading;
- the first chamber of the body is formed in the first casing;
- the second chamber of the body is formed in the second casing; and
- the separating board is disposed in the first chamber and is adjacent to the second chamber.

11. The portable water purifier as claimed in claim 4, wherein
- the body has
  - a first casing; and
  - a second casing mounted to the first casing by threading;
- the first chamber of the body is formed in the first casing;
- the second chamber of the body is formed in the second casing; and
- the separating board is disposed in the first chamber and is adjacent to the second chamber.

12. The portable water purifier as claimed in claim 5, wherein
- the body has
  - a first casing; and
  - a second casing mounted to the first casing by threading;
- the first chamber of the body is formed in the first casing;
- the second chamber of the body is formed in the second casing; and
- the separating board is disposed in the first chamber and is adjacent to the second chamber.

13. The portable water purifier as claimed in claim 12, wherein the body is mounted to the cover by threading.

14. The portable water purifier as claimed in claim 13, wherein the porous element has
- two surfaces; and
- multiple ribs disposed separately on one of the two surfaces of the porous element that faces the separating board.

15. The portable water purifier as claimed in claim 12, wherein the porous element has
- two surfaces; and
- multiple ribs disposed separately on one of the two surfaces that faces the separating board.

16. The portable water purifier as claimed in claim 11, wherein the body is mounted to the cover by threading.

17. The portable water purifier as claimed in claim 16, wherein the porous element has
- two surfaces; and
- multiple ribs disposed separately on one of the two surfaces that faces the separating board.

18. The portable water purifier as claimed in claim 11, wherein the porous element has
- two surfaces; and
- multiple ribs disposed separately on one of the two surfaces that faces the separating board.

* * * * *